United States Patent [19]
Collins

[11] Patent Number: 4,779,216
[45] Date of Patent: Oct. 18, 1988

[54] SYSTEM FOR CALIBRATING A MONOCHROMATOR

[75] Inventor: John B. Collins, Westport, Conn.

[73] Assignee: The Perkin-Elmer Corporation, Norwalk, Conn.

[21] Appl. No.: 837,438

[22] Filed: Mar. 7, 1986

[51] Int. Cl.$^4$ .................. G01C 25/00; G06F 15/20
[52] U.S. Cl. .................. 364/571.02; 73/1 R; 356/138; 356/346; 364/525; 364/167.01
[58] Field of Search ........... 364/153, 170, 525, 559, 364/571, 576; 356/71, 138, 308, 320, 346; 73/1 R, 1 E, 432 L

[56] References Cited

U.S. PATENT DOCUMENTS

| | | | |
|---|---|---|---|
| 3,973,849 | 8/1976 | Jackson et al. | 356/308 |
| 3,981,562 | 9/1976 | Anthon | 356/71 |
| 4,223,995 | 9/1980 | Fletcher | 356/320 |
| 4,252,439 | 2/1981 | Drozella | 356/138 |
| 4,298,944 | 11/1981 | Stoub et al. | 364/571 |
| 4,329,051 | 5/1982 | Chamran et al. | 356/320 |
| 4,432,640 | 2/1984 | Grage et al. | 356/138 |
| 4,468,119 | 8/1984 | Hamar | 356/138 |
| 4,471,447 | 9/1984 | Williams et al. | 364/559 |
| 4,605,304 | 8/1986 | Leitz et al. | 356/138 |

FOREIGN PATENT DOCUMENTS

0121714 10/1984 European Pat. Off. ............ 356/320

Primary Examiner—Parshotam S. Lall
Assistant Examiner—Kevin J. Teska
Attorney, Agent, or Firm—Francis L. Masselle; Edwin T. Grimes; Ronald G. Cummings

[57] ABSTRACT

A method for calibrating a monochromator to compensate for mechanical imperfections in its diffraction grating and grating drive assembly employs a two stage interactive procedure which permits the use of small (0.2 nm) spectral regions for the identification of emission lines. An iterative, self-consistent, discrete Fourier transform is used for the determination of multiple positioning correction terms. When the Fourier calculations are completed, the results of the calibration procedure are presented by the system to the analyst for acceptance. If accepted, the positioning error of the primary calibration line is measured, stored and used by the system to maintain a zero centered distribution of positioning errors each time the monochromator is reinitialized.

52 Claims, 3 Drawing Sheets

SYSTEM FOR CALIBRATING A MONOCHROMATOR

BACKGROUND OF THE INVENTION

1. Field of the Invention

The invention relates generally to systems for improving the positioning accuracy of monochromators and particularly relates to calibration systems which compensate for mechanical imperfections in a monochromator's diffraction grating and grating drive assembly.

2. Description of the Relevant Art

Monochromators and their applications are well known in the prior art. In particular, monochromators are known which employ a diffraction grating to disperse a light beam incident on the grating into a spectrum. A system for creating a spectrum using a diffraction grating is shown in U.S Pat. No. 3,973,849, issued Aug. 10, 1976 to Jackson, et ak, entitled SELF-CALIBRATABLE SPECTRUM ANALYZER. The diffraction grating may be rotated by a mechanical drive assembly to assume a position which enables a desired portion of the spectrum to be analyzed.

The width and pitch of the teeth of the diffraction grating, along with other factors, e.g., imperfections in portions of the mechanical drive itself, are capable of introducing significant error into the instrument. This, error affects attempts to accurately position the grating to locate spectral lines of interest. The errors may be of such magnitude as to require large spectral windows to find the desired spectral lines. As a consequence of having to use these large windows the lines used to calibrate the instrument can easily be misidentified, particularly as the number of lines and their density increases.

Prior systems used for calibrating a monochromator to improve positioning accuracy involve making assumptions as to the source (or sources) and nature of error.

For example, one known system utilizes the fact that a specific component of the grating drive assembly, the worm gear, has a particular period of rotation. According to the method employed by the known system, the phase and amplitude of a correction term associated with the period of rotation of the worm gear would be determined and be used to develope an error correction term based on the known source of error.

The prior art technique referred to hereinabove, for calibrating a monochromator with a mechanical grating drive based on a known source of error, calibrates an instrument to within plus or minus 0.015 nm. This system requires approximately 45 to 50 lines to perform the calibration.

It has been determined that it would be desirable to be able to calibrate a monochromator with a mechanical grating drive to within plus or minus 0.002 nm using approximately twice the number of lines used by known systems and bv using small spectral windows.

It has also been determined that it would be desirable to have the operator or analyst in the loop for determining when an instrument is calibrated to an acceptable level and to allow the user to increase the number of lines to be positioned during the calibration process. This is particularly useful in the event preselected lines are rejected during the calibration process and the operator is desirous of using additional lines to calibrate the instrument to a desired level.

Further still, it has been determined that it is desirable to have a system for calibrating a monochromator which does not require making assumptions regarding the source of error, but which inherenly compensates for the largest sources of error identified through use of the system itself.

SUMMARY OF THE INVENTION

According to the invention, the desired system is one which implements a two stage interactive calibration procedure that permits the use of small (0.2 nm) spectral regions for the identification of emission lines. The preferred embodiment of the invention utilizes computer means to implement the two stage procedure.

During the first stage of the disclosed procedure the system measures the positioning error of a small set of emission lines, (approximately 6 according to the preferred embodiment), to establish a coarse correction to the grating drive mechanism. The preferred embodiment uses a 0.4 nm window to perform the coarse correction.

An iterative, self-consistent, discrete Fourier transform is used for the determination of multiple positioning correction terms during the second stage of the procedure.

When the Fourier calculations are completed, the system presents the results of the two stage calibration to the analyst for acceptance. If accepted, the system measures the positioning error of the primary calibration line, stores this error value and uses the value to maintain a zero centered distribution of positioning errors each time the monochromator is reinitialized.

According to the preferred embodiment of the invention, the second stage processing is performed with approximately 100 lines. The narrow 0.2 nm window used during the second stage may be used with confidence because of the coarse correction performed during the first stage.

It is an object of the invention to provide a system and methodsfor calibrating a monochromator to improve its positioning accuracy using a relatively large number of spectral lines and a small spectral window.

It is a further object of the invention to provide a system and methods for calibrating a monochromator to within plus or minus 0.002 nm.

It is still a further object of the invention to provide a calibration system which allows for operator interaction and which makes no assumptions regarding the source of errors but rather corrects for the largest actual sources of error identified by the system itself.

Other objects and features of the present invention will become apparent to those skilled in the art upon consideration of the following detailed description and the accompanying Drawing, in which like reference designations represent like features throughout the figures.

BRIEF DESCRIPTION OF THE DRAWING

FIG. 4 also shows a polynomial, P(steps), fit to these points.

DETAILED DESCRIPTION

Figure 1:
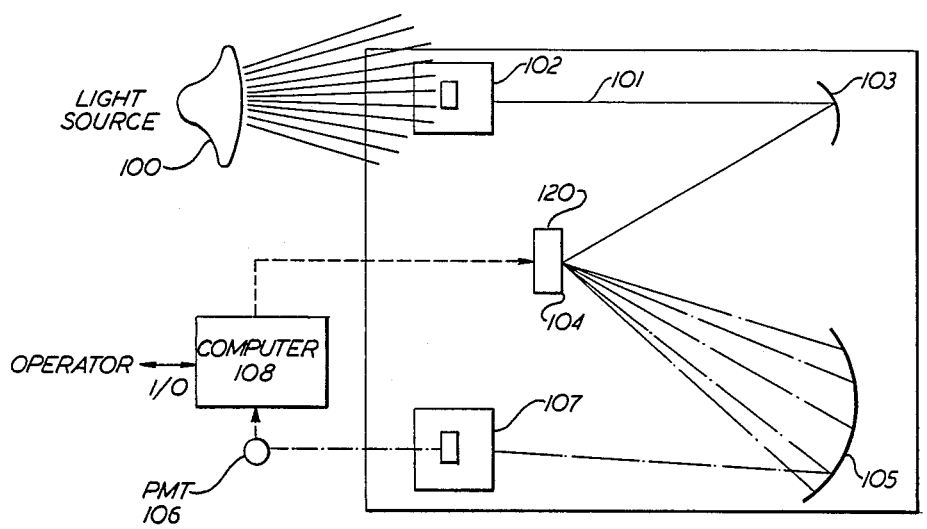
FIG. 1 depicts a monochromator which includes a diffraction grating used to disperse a light beam and wherein the grating may be positioned to locate a preselected spectral line.

FIG. 1 depicts a monochromator which directs light beam 101 from light source 100 to diffraction grating 104 via entrance slit 102 and mirror 103. Diffraction grating 104 in the depicted monochromator may be rotated by a mechanical grating drive assembly, 120, to focus selected portions of the spectrum, generated by beam 101 striking the grating, to photomultiplier detector 106 via mirror 105 and exit slit 107. A dashed line is shown coupling computer 108 to assembly 120 and detector 106 to indicate the preferred embodiment of the invention wherein the rotation of grating 104 is performed under computer control.

Programmed portions of computer 108 are responsive to inputs from detector 106 to determine when and if chosen spectral lines have been located and to actually perform the calibration of the monochromator. A detailed functional description of these programmed portions of computer 108 is set forth hereinafter in terms of a preferred set of method steps which one of ordinary skill in the art may implement in the form of any desired combination of hardware and software.

The preferred embodiment of the invention may be realized utilizing a commerically available Perkin-Elmer Model 7500 computer, programmed in "C", operating under the copyrighted software operating system known as IDRIS developed by, and commercially available from, Whitesmiths Ltd. of Concord, Mass.

Figure 2:
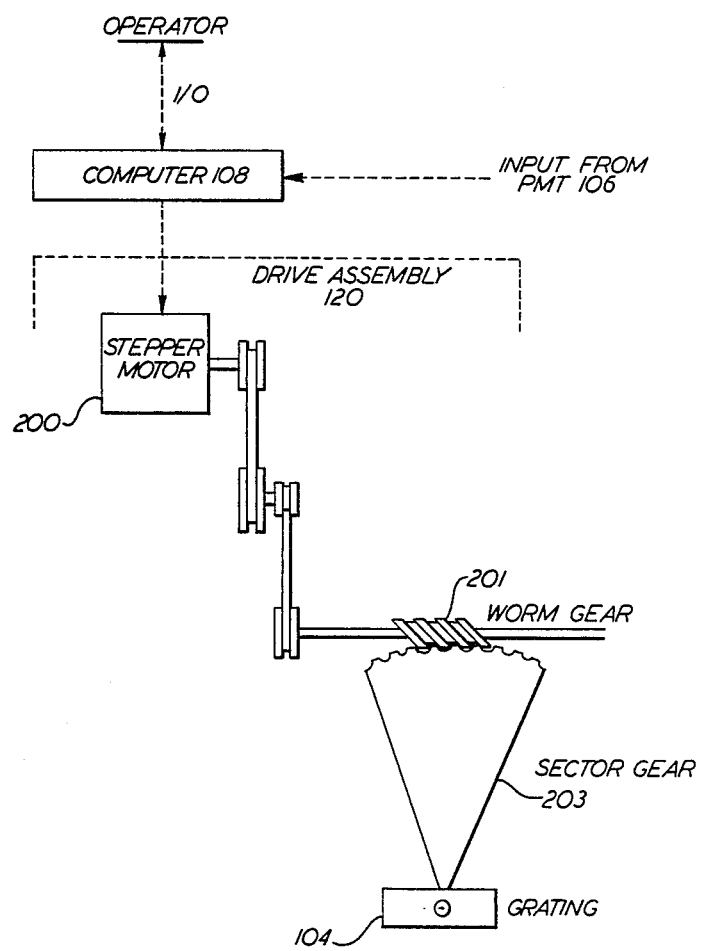
FIG. 2 depicts an example of a grating drive assembly suitable for rotating the diffraction grating shown in FIG. 1 into a preselected position.

FIG. 2 depicts an example of a mechanical grating drive assembly suitable for use in a monochromator which may be calibrated by the method to be set forth in detail hereinafter. FIG. 2 shows a small stepper motor 200, used to turn worm gear 201 via a set of pulleys and belts. As worm gear 201 is rotated, sector gear 203 is utilized to reposition diffraction grating 104 (corresponding to grating 104 of FIG. 1). Again, computer 108 is shown coupled to drive assembly 120, in particular to stepper motor 200, for controlling the rotation of grating 104 in accordance with the procedure to be described in detail hereinafter.

For each "step" of motor 200, grating 104 undergoes an angular displacement causing a different portion of the spectrum generated by beam 101 striking grating 104 to be channelled to photomultiplier detector 106. Thus, the theoretical number of steps required to rotate grating 104 by an angle $\phi$ to locate a specific spectral line, may be expressed as:

$$\text{theoretical number of steps} = c \cdot \phi; \quad (1)$$

where c is a constant.

It should be understood that the monochromator depicted in FIG. 1 and the mechanical grating drive assembly shown in FIG. 2 are used for the sake of illustration only. The method disclosed herein is suitable for any mechanically driven diffraction grating where the theoretical number of steps to rotate the grating to a preselected position may be determined by using the grating equation to determine "c" for the monochromator being calibrated.

The grating equation for a given monochromator is a function of the instrument's design including length, line density of the grating and angle subtended by the light path in the instrument. The well known prior art technique for computing the theoretical number of steps to rotate the grating to a predetermined position is set forth in the text DIFFRACTION GRATINGS by M. C. Hutley, published by Academic Press, New York, N.Y., 1982, and does not constitute a part of the present invention.

Prior to explaining the two stage method employed by the disclosed system, it should be understood that the difference between the theoretical number of steps to position grating 104 to locate a given spectral line, and the actual number of steps required to locate the line with an uncalibrated instrument, is defined hereinafter as the "positioning error" related to the given line. This is sometimes expressed hereinafter as "$\Delta$ steps" where $\Delta$ is the difference between the theoretical and actual number of steps to locate a given line.

Figure 5:
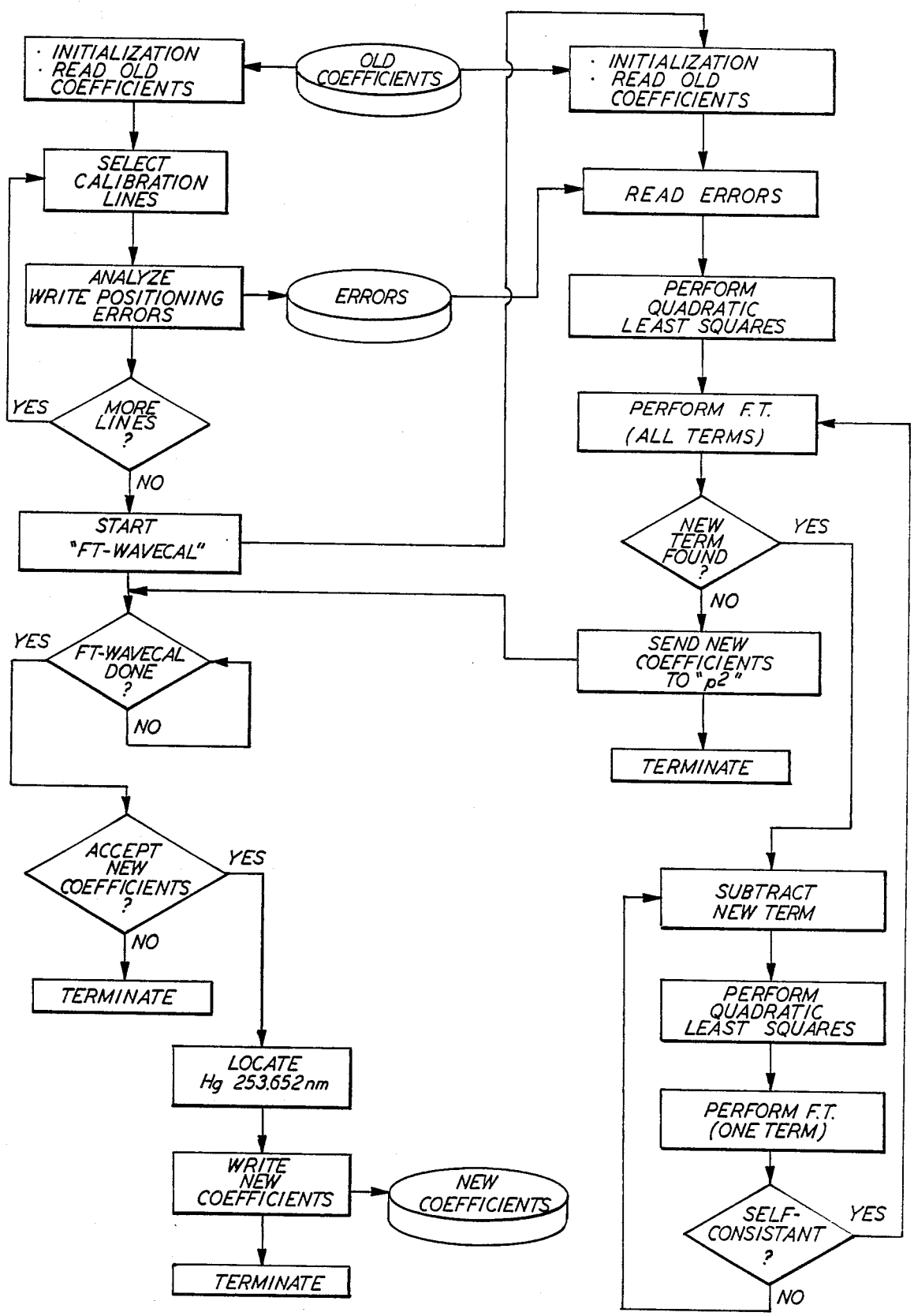
FIG. 5 is a flow chart of the method contemplated by the invention.

Before describing in detail preferred embodiments of the invention, and to facilitate an understanding thereof, the general concept of the computer programs employed will now be described with reference to the flow chart constituting FIG. 5.

The flow chart describes the operation of two programs, one designated "P2" and the other designated "FT Wavecal". The P2 program contains the user interaction portion of the software and the FT Wavecal program carries out the actual numerical calculations.

To use the calibration procedure, the appropriate portion of the P2 program must be initialized by the user. During initialization procedure, the program reads a disc file containing any old correction coefficients that may be present. This is designated in the upper left corner of the flow chart. At this point, the user is asked to select lines to be used for calibration, that is, to select appropriate atomic emission lines usually drawn from the entire operating spectrum of the monochromator.

Once a set of lines is selected, the user then instructs the instrument to analysze those emission lines and the program will then create a disc file containing the positioning errors of those lines. That is, the positioning error is the deviation of the monochromator between the actual position at which the line is found and the theoretical position of that line. When this set of lines is completed, the user is then asked if he wishes to analyze more lines; if he does, he can then repeat the procedure. When the user indicates that no more lines are to be analyzed, the user interaction program P2 automatically starts a second program, FT Wavecal, which then runs in background. The P2 program then waits for the FT Wavecal program to indicate that it has completed its calculations.

The FT Wavecal program also reads the file containing any old coefficients so that it will know what assumptions the P2 program made in finding the lines in the first place. It will then read the file containing the positioning errors in order to carry out its calculation. Once the file of positioning errors has been read, the FT Wavecal program carries out a quadratic least squares calculation to remove any polynomial component to the positioning error. After having performed the quadratic least squares, the FT Wavecal program then performs a discrete Fourier transform on the residual error remaining after the quadratic polynomial component has been removed. This Fourier transform is carried out over all candidate terms in the transform, i.e., periods ranging from one-quarter of the worm gears revolution to approximately 60 times the worm gears revolution are all considered.

All of these terms have been evaluated to determine if any are of sufficient magnitude to be considered new terms. If a term is found that meets the selection criteria, namely this term has not been found before and it has sufficient amplitude, that term is then subtracted from the residual errors and a further test for self-consistency begins. In the test for self-consistency, the quadratic least squares procedure is repeated and then the Fourier transform of that particular term is repeated as well. If, following this procedure, no change has occurred in the phase and amplitude of the Fourier transform term and in the coefficients of the polynominal term, then the correction is said to be self-consistent. If it is not self-consistent, which would usually be the case, the quadratic least squares procedure and the Fourier transform procedure of the one new term are repeated until some test of self-consistency is met.

Once self-consistency is met, the FT Wavecal program then repeats the discrete Fourier transform over all terms to determine if another correctional term can be found. This procedure is repeated until either no more terms are found or some other stopping rule is met. Once no more terms are to be found, the set of new coefficients is sent to the P2 program along with a message saying that the FT Wavecal program is done. When the P2 program detects this message, it then presents the user with a summary of the new results. The user may then, at his option, elect to accept the new set of coefficients or to reject them. If they are accepted, which would normally be the case, the program will then automatically locate the primary reference, that being the Mercury 253.652 nanometer emission line, and write the new coefficients and the location of the primary reference line to a disc file and then it will end, that is, the P2 program will terminate.

If the user elects not to accept the new coefficients, the program will terminate with no action having been taken.

This is a high level summary of the actions of the two programs, P2 and FT Wavecal without consideration of the role that other programs may play in the calculations, although the role of those other programs is incidental to the wavelength calibration and is not central to the exposition of the idea.

The first stage of the method involves performing a coarse calibration of the instrument using a relatively small number of spectral lines.

According to the preferred embodiment of the invention a mercury lamp is used to generate beam 101 (FIG. 1) which grating 104 converts into a set of nine, well defined, well isolated, spectral lines within the operating range of the instrument, having the following wavelengths: $\lambda_1 = 184.949$; $\lambda_2 = 253.652$; $\lambda_3 = 313.183$; $\lambda_4 = 365.015$; $\lambda_5 = 366.328$; $\lambda_6 = 404.656$; $\lambda_7 = 435.835$; $\lambda_8 = 546.074$; and $\lambda_9 = 579.065$.

Figure 3:
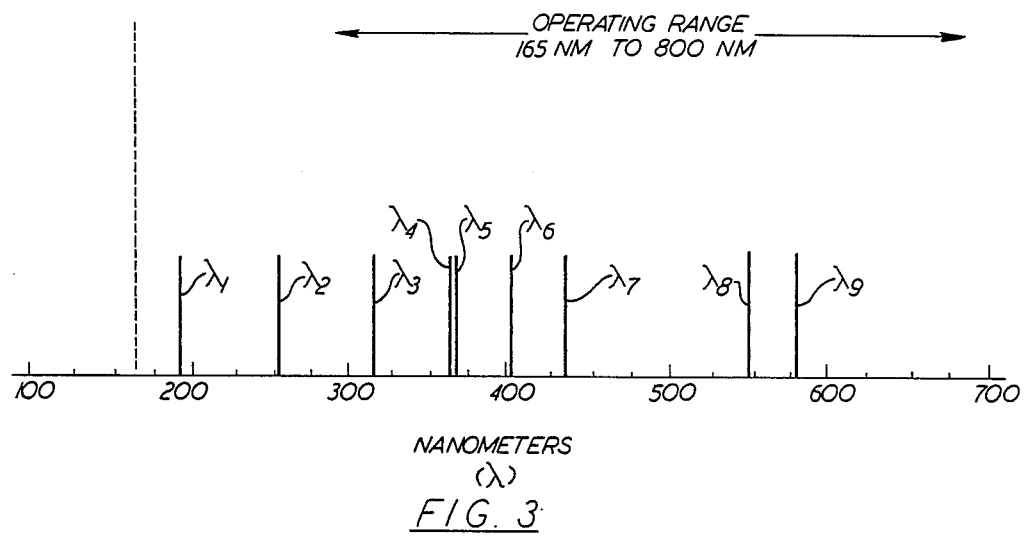
FIG. 3 depicts the operating range of the instrument (spectral range) along with a set of spectral lines for the element mercury.

These lines are depicted in FIG. 3 which illustrates the isolation and distribution of the mercury lines over the depicted operating range of the monochromator.

In order to illustrate the system, suppose that seven of these wavelengths are arbitrarily chosen for use in the first stage of calibration and a 0.4 nm spectral window is used to locate the seven well isolated lines. Computer 108 takes the difference between the actual number of steps to position grating 104 for each line with respect to the theoretical number of steps to position grating 104 on each of the chosen lines. Computer 108 receives input via detector 106 to determine when lines have actually been located. Each of these seven differential step values is plotted by computer 108 against the chosen wavelengths and fitted by a polynomial to get a representation of the error. This polynomial is used by subsequent method steps, executed by computer 108, as the aforementioned coarse correction.

Figure 4:
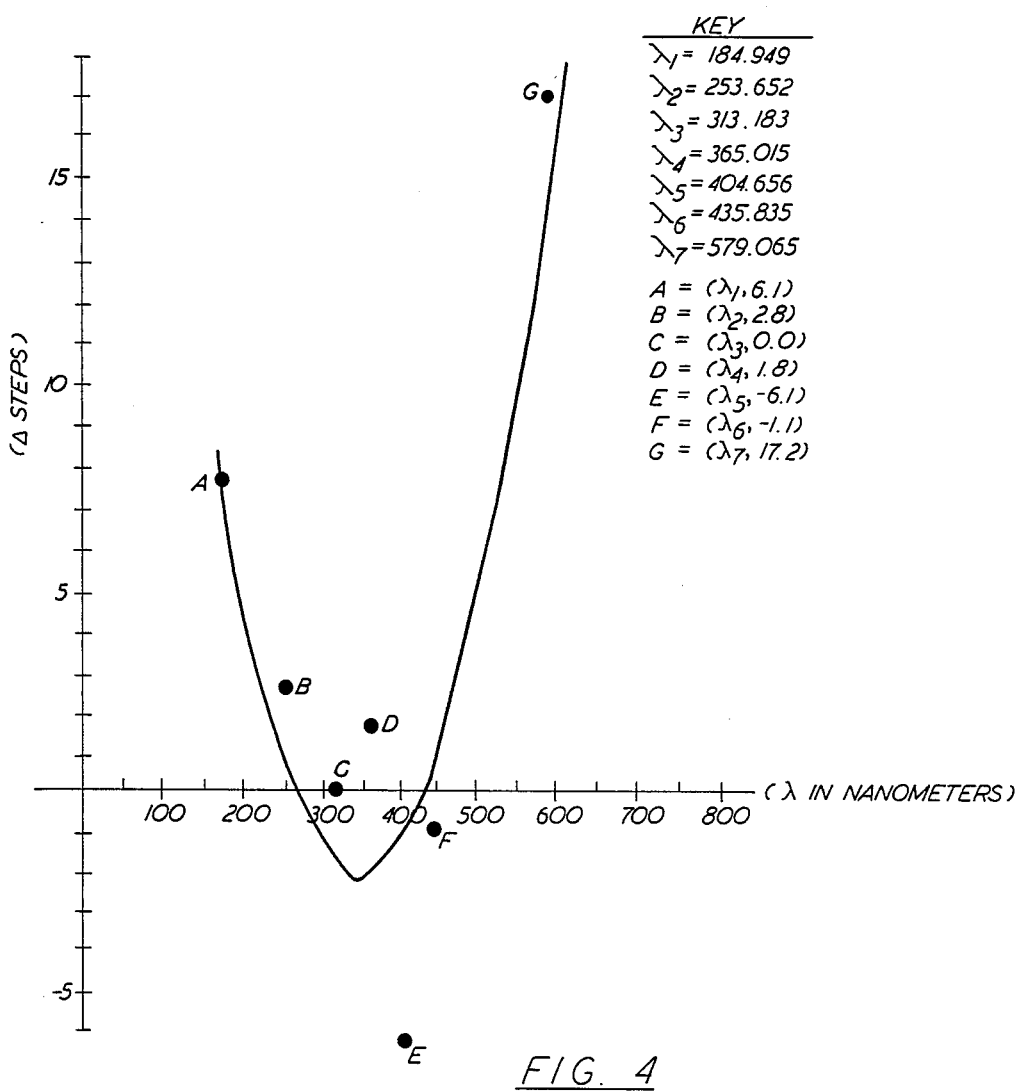
FIG. 4 depicts a plot of the theoretical number of grating steps to locate several mercury lines versus the difference between the theoretical number of steps and actual number of steps to locate these lines.

The preferred embodiment of the invention uses the method of least squares to obtain a quadratic polynomial, hereinafter referred to as P(steps). An illustration of such a fit and representation of P(steps), the first stage coarse correction polynomial, is shown in FIG. 4.

The goal in the first stage of the method is to obtain a polynomial representative of the error. Any method (it doesn't have to be a least squares method) to obtain the coarse correction polynomial is suitable and would constitute an equivalent method step to using the method of least squares.

Similarly, the choice of the "small" number of spectral lines is arbitrary. It could have been 5 lines, 8 lines, etc. The goal being to get enough points to roughly determine P(steps) and not crowd the spectrum.

The choice of mercury to obtain the spectral lines in accordance with the preferred embodiment is also not meant to be a limiting factor regarding the disclosed method. The criterion is to select an element based on good isolation of a few lines from one another and from any source of lines that happens to exist. Virtually any element having prominent lines in the operating range of the instrument would work so long as its light could be directed into the instrument in the form of beam 101.

Reference may be made to MIT's, MIT WAVELENGTH TABLES, edited by George R. Harrison, published by MIT, Cambridge, Mass., 1969, to select an element to perform the first stage calibration meeting the aforesaid criterion and for determining where all the known spectral lines for all the known elements occur (i.e. their wavelengths). Having obtained P(steps) the method enters stage 2.

The objective of stage 2 is to obtain a more refined correction resulting in a best estimate of the aperiodic component of the positioning errors and a best estimate of a preselected number of periodic correction terms. This is achieved by computer 108 performing an iterative, self-consistent, discrete Fourier transform to determine the multiple positioning correction terms referred to hereinbefore. The preferred embodiment of the invention determines up to ten periodic correction terms.

In this second stage, according to the preferred embodiment, the spectral window is cut to 0.2 nm and the system proceeds to obtain Δ steps for approximately 70 to 100 preselected spectral lines. However, when Δ steps is now computed by computer 108 for each of the chosen lines, the coarse correction determined in stage one is first factored in. In other words, the Δ step value for each line is the actual number of steps to locate the given line less the first corrected step value ("FCSV") for the given line, where:

FCSV = theoretical step value + P(steps)  (2)

The next method step is to obtain a polynomial fit for the computed Δ step values versus first corrected step values. The technique for obtaining this polynomial, hereinafter referred to as P'(steps) is, according to the preferred embodiment, the same as shown in FIG. 4 to obtain P(steps).

The next method step performed by computer 108 in stage 2 is to recompute P(steps) taking into account the P'(steps) polynomial. The recomputed P(steps) is hereinafter referred to as $P_2$(steps) where:

$$P_2(\text{steps}) = P(\text{steps}) + P'(\text{steps}). \qquad (3)$$

$P_2$ of steps is an improved estimate of the aperiodic component of the positioning error which takes into account the relatively large number of sample points and the aforementioned coarse correction.

The next method step performed by computer 108 is to construct the set of residual errors, hereinafter referred to as $R_0$, by taking the set of observed errors (most recently computed $\Delta$ step values) for each of the chosen wavelengths and subtracting from each $\Delta$ step value P'(steps) evaluated at the appropriate wavelength, i.e., the wavelength associated with a particular $\Delta$ step value. The values in the resulting set, $R_0$, each represent a residual positioning error associated with a particular wavelength.

Once $R_0$ is constructed, the system proceeds togg determine if any significant periodic correction terms exist. This is accomplished by subjecting the set of residual errors, $R_0$, to a Fourier transform over a preselected range of periods to identify the periodic term with the greatest amplitude. This method step is hereinafter referred to as the "outside loop iterative step.

According to the preferred embodiment of the invention, the method uses periods in the range of 1500 steps to 300,000 steps for the Fourier transform. This constitutes a mathematically complete set of periods.

In selecting the periodic term with the greatest amplitude the preferred embodiment of the invention first tests to see if amplitude of any term exceeds 0.4 grating steps. The value 0.4 is arbitrary but was chosen to provide a stopping rule for the method, i.e., a conclusion that no (or no further) significant periodic correction terms exist, and was also selected to provide a threshold to discriminate against noise.

Assuming one or more terms has an amplitude exceeding 0.4 grating steps and one of the other stopping rules (to oe described hereinafter) is not met, the method implemented by computer 108 continues by subtracting from each element of the set $R_0$, the identified correction term having the largest amplitude. The resulting set, hereinafter referred to as $R_1$, comprises an improved set of residuals.

At this point the coefficients of the Fourier transform are stored and, in subsequent iterations of this step, are accumulated.

Next, a Fourier transform is applied by computer 108 to the set $R_1$ at a particular period, where the period chosen is the period just determined as having the largest amplitude. The result is a correction to the previously identified periodic term. This step is hereinafter referred to as the "inside loop iterative step."

Next, computer 108, subtracts this new correction term from each element in $R_1$, to obtain $R_2$, and accumulates the coefficients of the periodic term. At this point the method also calls for the continued accumulation of the coefficients of all prior periodic terms identified and selected by the method. The rational is to keep all the corrections self-consistent.

Using $R_2$ (i.e., performing a polynomial fit to $R_2$) P''(steps) can be obtained. P''(steps) is a further correction to $P_2$(steps) and is accumulated along with P(steps) and P'(steps) to improve the estimate of the aperiodic component of the positioning error, i.e. to obtain the coefficients of polynomial $P_3$(steps).

The method employed by computer 108 continues by next computing $R_2'$ (i.e., $R_2$ with P''(steps) taken from each point.)

The method now returns to the inside loop iterative step with $R_2'$ replacing $R_1$, with a new $R_2$ and $R_2'$ to be computed, along with P'''(steps), instead of P''(steps), and so on for each additional iteration.

According to the preferred embodiment of the invention the inside loop is performed by computer 108 five times. The generalized criterion for selecting a number of iterations to be performed is to loop until the correction term is some arbitrarily small, acceptable value.

Next, the method returns to the outside loop iterative step, using the last computed set $R_2'$ in place of $R_0$, to identify a second periodic correction term, etc. until a stopping rule is met.

In addition to the stopping rule referred to hereinbefore regarding the amplitude threshold, the method, according to the preferred embodiment of the invention, checks to see if ten correction terms have been found. If so, a stopping rule is met. If not, then the method calls for dividing the number of lines used to calibrate the instrument by 10, rounding down to the nearest integer, and determining if this integral number of correction terms has been identified. For example, for 87 lines, the question is "have 8 correction terms been found?" If so, a stopping rule is met. Obviously the values chosen for the stopping rules can be varied without departing from the scope or spirit of the invention.

Again, if no stopping rule is met, the method implemented by computer 108 continues with the outside loop iterative step.

To recapitulate, the disclosed system employs a method which accumulates the coefficients of a correction polynomial which is the best estimate of the aperiodic component of the positioning errors.

If:
$P(\text{steps}) = ax^2 + bx + c$
$P'(\text{steps}) = a'x^2 + b'x + c'$ and
$P''(\text{steps}) = a''x^2 + b''x + c$ etc., at the end of the disclosed method $a + a' + a'' + \ldots$ etc., $b + b' + b'' + \ldots$ etc., and $c + c' + c'' + \ldots$ etc. have all been accumulated by the system to yield the desired coefficients.

At the same time, the system will have computed a set of periodic correction terms (as many as ten of them according to the preferred embodiment of the invention) defining the coefficients of a Fourier transform to correct for each of the identified periodic components of the positioning error.

It should be noted that these terms do not come from any assumptions made about the source or nature of the error, but rather are corrections for the largest sources of error as determined by the system itself.

One of the significant features of the preferred embodiment of the invention is that it provides for interaction with the operator. Thus, the system may be used to determine if additional lines are desired, i.e. to effectively instruct that the instrument be recalibrated, after presentation of the aforementioned results to the user for approval. A CRT display is the preferred means for presenting the user with the coefficients accumulated by and stored in computer 108. Obviously, a system storing said coefficients on disc, etc., or presenting data to an operator by any other input/output vehicle, would come within the spirit and scope of the invention.

Not discussed before, but inherent in the preferred calibration method, is the removing of a line from the set used to calibrate the machine if the residual error, i.e., a point in $R_0$, $R_1$, $R_2$ or $R_2'$ (hereinafter referred to as $R_i$), at any portion of stage 2 is greater then 3.5 times the root mean square residual, i.e.

Whenever this happens, the method described hereinbefore starts stage 2 over again with one less line. In instances where several lines are rejected during the calibration process, the operator very well might not be satisfied with the calibration results and utilize the interactive capability of the system to specify recalibration with additional lines.

Finally, the disclosed system utilizes all the correction terms identified (if approved by the operator) to locate one of the original coarse calibration lines defined hereinafter as the primary spectral line. According to the preferred embodiment of the invention this primary spectral line is chosen to be one of the original mercury lines used in stage 1. The primary line will generally have an offset from where it should be (i.e. there still exists a position error). Before completing the novel method, this error is measured by computer 108 and stored with all the computed coefficients so that on subsequent initialization of the instrument by the calibration system, the system relocates the primary spectral line appropriately, i.e., at the error position. In this way the validity of all the calculated correction terms is preserved whenever the machine is reinitialized.

The foregoing description of a preferred embodiment of the invention and apparatus for achieving the disclosed objects of the invention has been presented for purposes of illustration and description. It is not intended to be exhaustive or to limit the invention to the precise form disclosed, and obviously many modifications and variations are possible in light of the above teaching. The embodiment disclosed was chosen and described in order to best explain the principles of the invention and its practical application to thereby enable others skilled in the art to best utilize the invention in various embodiments and with various modifications as are suited to the particular use contemplated. It is intended that the scope of the instant invention be defined by the claims appended hereto.

What is claimed is:

1. A method for calibrating a monochromator, to compensate for mechanical imperfections is its defraction grating and grating drive assembly which cause positioning error in spectral emission lines, comprising the steps of:
   (a) measuring the positioning error of a first preselected set of emission lines to establish a coarse correction to the positioning error attributable to said imperfections; and
   (b) obtaining a polynomial fit to determine a set of multiple positioning correction terms for an expanded preselected set of emission line utilizing an iterative self-consistent Fourier transform.

2. A method as set forth in claim 1 wherein said step of measuring is performed utilizing a first preselected spectral window and said step of determining is performed utilizing a second spectral window which is narrower then said first window.

3. A method set forth in claim 1 further comprising the step of presenting the polynomial and Fourier transform coefficients for said determined multiple positioning correction terms to an operator for acceptance.

4. A method as set forth in claim 1 further comprising the steps of:
   (a) choosing a primary reference line from said first preselected set of emission lines;
   (b) utilizing said determined set of multiple positioning correction terms to locate said chosen primary reference line;
   (c) measuring the offset of the located primary reference line from its theoretical position; and
   (d) storing the measured offset of said primary reference line together with the polynomial and Fourier transform coefficients for said multiple positioning correction terms so that on subsequent reinitialization of said monochromator it is able to relocate the primary reference line at the offset position to preserve the validity of said coefficients.

5. A method as set forth in claim 1 wherein said step of determining further includes the steps of:
   (a) determining the residual error for each line in said expanded preselected set of emission lines throughout said iterative process;
   (b) removing a line from said expanded preselected set if the residual error associated with said line is ever greater than a preselected threshold value during said iterative process; and
   (c) recomputing said set of multiple positioning correction terms utilizing said expanded preselected set of emission lines less the line removed from said set.

6. In a monochromator having a grating and grating drive assembly, a method for compensating for mechanical imperfections in the diffraction grating and drive assembly causing positioning errors having an aperiodic component comprising the steps of:
   (a) generating a light beam;
   (b) introducing the light beam into said monochromator;
   (c) directing the light beam to strike said diffraction grating to create a spectrum;
   (d) positioning said diffraction grating to locate a first set of preselected spectral lines in said spectrum by rotating said drive assembly a discrete number of steps and using a first preselected spectral window to isolate each line in said first set;
   (e) measuring the positioning error, $\Delta$steps, for each isolated spectral line in said first set; and
   (f) fitting a polynomial, P(steps), to said measured positioning errors plotted against the wavelength of said isolated lines from said first set to thereby obtain a coarse correction for said mechanical imperfections.

7. A method as set forth in claim 6 further comprising the steps of:
   (a) utilizing said coarse correction to position said diffraction grating to locate a second set of preselected spectral lines in said spectrum wherein a second preselected spectral window, smaller then said first window, is used to isolate each line in said second set;
   (b) measuring the positioning errors for each line located in said second set;

(c) fitting a polynomial, P'(steps), to the measured positioning error versus wavelength, for each isolated line in said second set; and (d) adding the coefficients of P(steps) and P'(steps) algebraically to obtain the coefficients of a polynomial, $P_2$(steps), which is an improved estimate of the aperiodic component of the positioning error.

8. A method as set forth in claim 7 wherein said step of fitting is performed by using the method of least squares.

9. A method as set forth in claim 7 wherein said step of measuring the positioning errors for each line located in said second set is performed by subtracting the first corrected step value for a given line in said second set from the actual number of steps required to locate said line, where each first corrected step value is calculated by adding the theoretical step value for a given line to the value of P(steps) for said line.

10. A method as set forth in claim 9 further comprising the step of constructing a set of residual errors, $R_0$, by subtracting P'(steps) from the measured positioning error for each line in said second set.

11. A method as set forth in claim 10 further comprising the steps of:
   (a) determining if any significant periodic correction term exists in said set of residual errors by subjecting said set of residual errors to a Fourier transform over a preselected range of periods;
   (b) determining if any of a predetermined set of stopping criteria are met wherein said set of criteria includes a determination that no periodic correction term of significance exists;
   (c) constructing, whenever none of said stopping criteria are met, an improved set of residual errors, $R_1$, as a function of the significant periodic correction term identified as having the largest amplitude;
   (d) accumulating the coefficients of said Fourier transform;
   (e) subjecting said improved set of residual errors, $R_1$, to a Fourier transform at the period of the correction term identified as having the greatest amplitude to obtain a correction to the identified periodic correction term;
   (f) subtracting said correction to the identified periodic correction term from each element in said improved set of residual errors to obtain a further improved set of residual errors, $R_2$;
   (g) accumulating the coefficients of the identified periodic term and the coefficients of all prior identified significant periodic correction terms to keep all corrections self-consistent;
   (h) performing a polynomial fit to said further improved set of residual errors to obtain P''(steps);
   (i) accumulating the coefficients of P''(steps) to obtain a further improved aperiodic correction term estimate;
   (j) constructing a still further improved set of residual errors, $R_2'$, by subtracting P''(steps) from each element of $R_2$;
   (k) repeating, for a preselected number of iterations, the method steps beginning at step (e), with the contents of $R_1$ set equal to the contents of $R_2'$ at the start of each iteration; and
   (l) repeating the method steps beginning at step (a) with the contents of $R_0$ set equal to the contents of $R_2'$ after said preselected number of iterations of method steps (e) through (k).

12. A method as set forth in claim 11 wherein said step of determining if any significant periodic correction term exists comprises the further steps of:
   (a) identifying the periodic correction term with the greatest amplitude;
   (b) measuring the amplitude of said identified periodic correction term; and
   (c) comparing said measured amplitude with a first preselected threshold value.

13. A method as set forth in claim 12 wherein said step of constructing the improved set of residual errors, $R_1$; comprises the step of subtracting from each element in said set of residual errors, $R_0$, the identified correction term having the largest amplitude exceeding said first threshold value.

14. A method as set forth in claim 11 wherein said predetetermined set of stopping criteria includes the identification of a preselected number of said significant periodic terms.

15. A method as set forth in claim 11 wherein said predetermined set of stopping criteria includes the identification of a preselected number of said significant periodic terms where said number of terms is a function of the numbers of lines in said second preselected set of emission lines.

16. A method as set forth in claim 11 further comprising the step of presenting the accumulated coefficients for said identified aperiodic term and the accumulated coefficients of all identified significant periodic correction terms to an operator for acceptance whenever a stopping criterion is met.

17. A method as set forth in claim 16 further comprising the steps of:
   (a) choosing a primary reference line from said first set of preselected emission lines;
   (b) utilizing said accumulated coefficients of said aperiodic and periodic correction terms to locate said chosen primary reference line;
   (c) measuring the offset of the located primary reference line from its theoretical position; and
   (d) storing the measured offset of said primary reference line together with said coefficients so that on subsequent reinitialization of said monochromator the device is able to relocate the primary spectral line at the offset position to preserve the validity of said coefficients.

18. A method as set forth in claim 11 further including the steps of:
   (a) determining the residual error for each line in said second preselected set of emission lines throughout said iterative process;
   (b) removing a line from said second preselected set if the residual error associated with said line is ever greater then a second preselected threshold value during said iterative process; and
   (c) recomputing the coefficients of said periodic and aperiodic correction terms utilizing said expanded preselected set of emission lines less the line removed from said set.

19. A method for compensating for mechanical imperfections in the diffraction grating and grating drive assembly of a monochromator, comprising the steps of:
   (a) generating a light beam;
   (b) introducing the light beam into said monochromator;
   (c) directing the light beam to strike said diffraction grating to create a spectrum;

(d) positioning said diffraction grating to locate a first set of preselected spectral lines in said spectrum by rotating said drive assembly a discrete number of steps and using a first preselected spectral window to isolate each line in said first set;

(e) measuring the positioning error, Δsteps, for each isolated spectral line in said first set;

(f) fitting a polynomial, P(steps), to said measured positioning errors plotted against the wavelengths of said isolated lines from said first set to thereby obtain a coarse correction for said mechanical imperfections;

(g) utilizing said coarse correction to position said diffraction grating to locate a second set of preselected spectral lines in said spectrum wherein a second preselected spectral window, smaller then said first window, is used to isolate each line in said second set;

(h) measuring the positioning errors for each line located in said second set by subtracting the first corrected step value for a given line in said second set from the actual number of steps required to locate said line, where each first corrected step value is calculated by adding the theoretical step value for a given line to the value of P(steps) for said line;

(i) fitting a polynomial, P'(steps), to the measured positioning error versus wavelength, for each isolated line in said second set;

(j) adding the coefficients of P(steps) and P'(steps) algebraically to obtain the coefficients of a polynomial, $P_2$(steps), which is an improved estimate of the aperiodic component of the positioning error; and (k) constructing a set of residual errors, $R_0$, by subtracting P'(steps) from the measured positioning error for each line in said second set.

20. A method as set forth in claim 19 further comprising the steps of:

(a) subjecting said set of residual errors to a Fourier transform over a preselected range of periods;

(b) identifying the periodic correction term with the greatest amplitude;

(c) measuring the amplitude of said identified periodic correction term; and (d) comparing said measured amplitude with a first preselected threshold value;

(e) determining if any of a predetermined set of stopping criteria are met wherein said set of criteria includes a determination that no periodic correction term of significance exists;

(f) constructing, whenever none of said stopping criteria are met, an improved set of residual errors, $R_1$, by subtracting from each element in said set of residual errors, $R_0$, the identified correction term having the largest amplitude exceeding said first threshold value;

(g) accumulating the coefficients of said Fourier transform;

(h) subjecting said improved set of residual errors, $R_1$, to a Fourier transform at the period of the correction term identified as having the greatest amplitude to obtain a correction to the identified periodic correction term;

(i) subtracting said correction to the identified periodic correction term from each element in said improved set of residual errors to obtain a further improved set of residual errors, $R_2$;

(j) accumulating the coefficients of the identified periodic term and the coefficients of all prior identified significant periodic correction terms to keep all corrections self-consistent;

(k) performing a polynomial fit to said further improved set of residual errors to obtain P''(steps);

(l) accumulating the coefficients of P''(steps) to obtain a further improved aperiodic correction term estimate;

(m) constructing a still further improved set of residual errors, $R_2'$, by subtracting P''(steps) from each element of $R_2$;

(n) repeating, for a preselected number of iterations, the method steps beginning with step (h), with the contents of $R_1$ set equal to the contents of $R_2'$ at the start of each iteration; and (o) repeating the method steps beginning at step (a) with the contents of $R_0$ set equal to the contents of $R_2'$ after said preselected number of iterations of method steps (h) through (n).

21. A method as set forth in claim 20 wherein said predetermined set of stopping criteria includes the identification of a preselected number of said significant periodic terms.

22. A method as set forth in claim 20 wherein said predetermined set of stopping criteria includes the identification of a preselected number of said significant periodic terms where said number of terms is a function of the numbers of lines in said second preselected set of emission lines.

23. A method as set forth in claim 20 further comprising the step of presenting the accumulated coefficients for said identified aperiodic term and the accumulated coefficients of all identified significant periodic correction terms to an operator for acceptance whenever a stopping criterion is met.

24. A method as set forth in claim 23 further comprising the steps of:

(a) choosing a primary reference line from said first set of preselected emission lines;

(b) utilizing said accumulated coefficients of said aperiodic and periodic correction terms to locate said chosen primary reference line;

(c) measuring the offset of the located primary reference line from its theoretical position; and (d) storing the measured offset of said primary reference line together with said coefficients so that on subsequent reinitialization of said monochromator the device is able to relocate the primary spectral line at the offset position to preserve the validity of said coefficients.

25. A method as set forth in claim 20 further comprising the steps of:

(a) determining the residual error for each line in said second preselected set of emission lines throughout said iterative process;

(b) removing a line from said second preselected set if the residual error associated with said line is ever greater than a second preselected threshold value during said iterative process; and (c) recomputing the coefficients of said periodic and aperiodic correction terms utilizing said second preselected set of emission lines less the line removed from said set.

26. A system, including computer means and program, for calibrating a monochromator having a grating and grating drive assembly to compensate for mechanical imperfections in the monochromator diffraction grating and grating drive assembly, comprising:
(a) means for measuring the positioning error of a first preselected set of emission lines to establish a coarse correction to the positioning error attributable to said imperfections; and
(b) means for obtaining a polynomial fit to determine a set of multiple positioning correction terms for an expanded preselected set of emission lines utilizing an iterative self-consistent Fourier transform.

27. A system as set forth in claim 26 wherein said means for measuring comprises a first portion of said computer program which utilizes a first preselected spectral window to locate each of the emission lines in said first set of lines.

28. A system as set forth in claim 27 wherein said means to determine comprises a second portion of said computer program which utilizes a second spectral window, narrower then said first window, to locate each of the emission lines in said expanded set of lines.

29. A system as set forth in claim 26 further comprising means for presenting the coefficients of said Fourier transform for said determined multiple positioning correction terms to an operator for acceptance.

30. A system as set forth in claim 29 wherein said means for presenting is a CRT display.

31. A system as set forth in claim 26 further comprising:
(a) means for choosing a primary reference line from said first preselected set of emission lines;
(b) means for utilizing said determined set of multiple positioning correction terms to locate said chosen primary reference line;
(c) means for measuring the offset of the located primary reference line from its theoretical position; and
(d) means for storing the measured offset of said primary reference line together with the coefficients for said multiple positioning correction terms so that on subsequent reinitialization of said monochromator the system is able to relocate the primary reference line at the offset position to preserve the validity of said coefficients.

32. A system as set forth in claim 31 wherein said means to determine further comprises:
(a) means for determining the residual error for each line in said expanded preselected set of emission lines throughout said iterative process;
(b) means for removing a line from said expanded preselected set if the residual error associated with said line is ever greater than a preselected threshold value during said iterative process; and
(c) means for recomputing said set of multiple positioning correction terms utilizing said expanded preselected set of emission lines less the line removed from said set.

33. A system, including a monochromator having a grating, grating drive assembly, and computer means and program, for compensating for mechanical imperfections in the diffraction grating and grating assembly comprising:
(a) means for generating a light beam;
(b) means for introducing the light beam into said monochromator;
(c) means for directing the light beam to strike said diffraction grating to create a spectrum; and
(d) means operating under the control of said computer means and program for positioning said diffraction grating to locate a first set of preselected spectral lines in said spectrum by rotating said drive assembly a discrete number of steps, utilizing a first preselected spectral window to isolate each line in said first set.

34. A system as set forth in claim 33 wherein said positioning means further includes detector means for signalling said computer means whenever one of said preselected spectral lines is located by said positioning means.

35. A system as set forth in claim 33 wherein a first portion of said computer program measures the positioning error, $\Delta$steps, for each isolated spectral line in said first set and a second portion of said computer program to fits a polynomial, P(steps), to said measured positioning errors plotted against the wavelengths of said isolated lines from said first set to thereby obtain a coarse correction for said mechanical imperfections.

36. A system as set forth in claim 35 wherein a third portion of said computer program utilizes said coarse correction to position said diffraction grating to locate a second set of preselected spectral lines in said spectrum utilizing a second preselected spectral window, smaller then said first window, to isolate each line in said second set.

37. A system as set forth in claim 36 wherein a fourth portion of said computer program measures the positioning errors for each line located in said second set, a fifth portion of said computer program is used to fit a polynomial, P'(steps), to the measured positioning error versus wavelength, for each isolated line in said second set; and a sixth portion of said computer program is used to add the coefficients of P(steps) and P'(steps) algebraically to obtain the coefficients of a polynomial, $P_2$(steps), which is an improved estimate of the aperiodic component of the positioning error.

38. A system as set forth in claim 37 wherein said fifth portion of said computer program performs said polynomial fit by using the method of least squares.

39. A system as set forth in claim 37 wherein said fourth portion of said computer program is operative to subtract the first corrected step value for a given line in said second set from the actual number of steps required to locate said line, where each first corrected step value is calculated by adding the theoretical step value for a given line to the value of P(steps) for said line.

40. A system as set forth in claim 37 wherein a seventh portion of said computer program constructs a set of residual errors, $R_0$, by subtracting P'(steps) from the measured positioning error for each line in said second set.

41. A system as set forth in claim 40 wherein an eighth portion of said computer program determines if any significant periodic correction term exists in said set of residual errors by subjecting said set of residual errors to a Fourier transform over a preselected range of periods.

42. A system as set forth in claim 41 wherein said eighth portion of said computer program is operative to identify the periodic correction term with the greatest amplitude, to measure the amplitude of said identified periodic correction term and to compare said measured amplitude with a first preselected threshold value.

43. A system as set forth in claim 41 wherein a ninth portion of said computer program determines if any of a predetermined set of stopping criteria are met, said set of criteria including a determination that no periodic correction term of significance exists and, whenever none of said stopping criteria are met, to construct an improved set of residual errors, $R_1$, as a function of the significant periodic correction term identified as having the largest amplitude.

44. A system as set forth in claim 43 wherein said predetermined set of stopping criteria includes the identification of a preselected number or said significant periodic terms.

45. A system as set forth in claim 43 wherein said predetermined set of stopping criteria includes the identification of a preselected number of said significant periodic terms where said number of terms is a function of the numbers of lines in said second preselected set of emission lines.

46. A system as set forth in claim 43 wherein a tenth portion of said computer program accumulates the coefficients of said Fourier transform.

47. A system as set forth in claim 46 wherein an eleventh portion of said computer program subjects said improved set of residual errors, $R_1$, to a Fourier transform at the period of the correction term identified as having the greatest amplitude to obtain a correction to the identified periodic term; to subtract said correction to the identified periodic correction term from each element in said improved set of residual errors to obtain a further improved set of residual errors, $R_2$; to accumulate the coefficients of the identified periodic term and the coefficients of all prior identified significant periodic correction terms to keep all corrections self-consistent; to perform a polynomial fit to said further improved set of residual errors to obtain P''(steps), to accumulate the coefficients of P''(steps) to obtain a further improved aperiodic correction term estimate and to construct a still further improved set of residual errors, $R_2'$, by subtracting P''(steps) from each element of $R_2$.

48. A system as set forth in claim 47 wherein a twelfth portion of said computer program repeats, for a preselected number of iterations, the operation of said eleventh portion of said computer program with the contents of $R_1$ set equal to the contents of $R_2'$ at the start of each iteration.

49. A system as set forth in claim 48 wherein a thirteenth portion of said computer program repeats the operation of said eighth through twelfth portions of said computer program with the contents of $R_0$ set equal to the contents of $R_2'$ after said preselected number of iterations of said eleventh program portion.

50. A system as set forth in claim 49 further comprising a fifteenth portion of said computer program operative to determine the residual error for each line in said second preselected set of emission lines throughout said iterative process; to remove a line from said second preselected set if the residual error associated with said line is ever greater then a second preselected threshold value during said iterative process; and to recompute the coefficients of said periodic and aperiodic correction terms utilizing said second preselected set of emission lines less the line removed from said set.

51. A system as set forth in claim 49 further comprising means for presenting the accumulated coefficients for said identified aperiodic term and the accumulated coefficients of all identified significant periodic correction terms to an operator for acceptance whenever a stopping criterion is met.

52. A system as set forth in claim 51 further comprising a fourteenth portion of said computer program operative, in response to an input from said operator to choose a primary reference line from said first set of preselected emission lines, to utilize said accumulated coefficients of said aperiodic and periodic correction terms to locate said chosen primary reference line; to measure the offset of the located primary reference line from its theoretical position and to store the measured offset of said primary reference line together with said coefficients so that on subsequent reintialization of said monochromator the system is able to relocate the primary spectral line at the offset position to preserve the validity of said coefficients.

* * * * *